June 8, 1937.   P. M. GIRARD   2,082,949
TACHOMETER
Filed Dec. 15, 1934    2 Sheets-Sheet 2
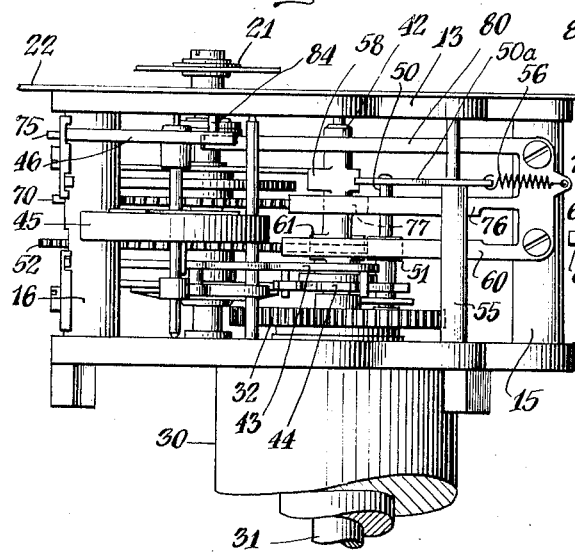
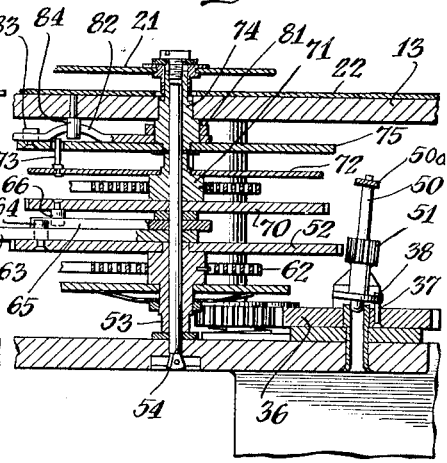
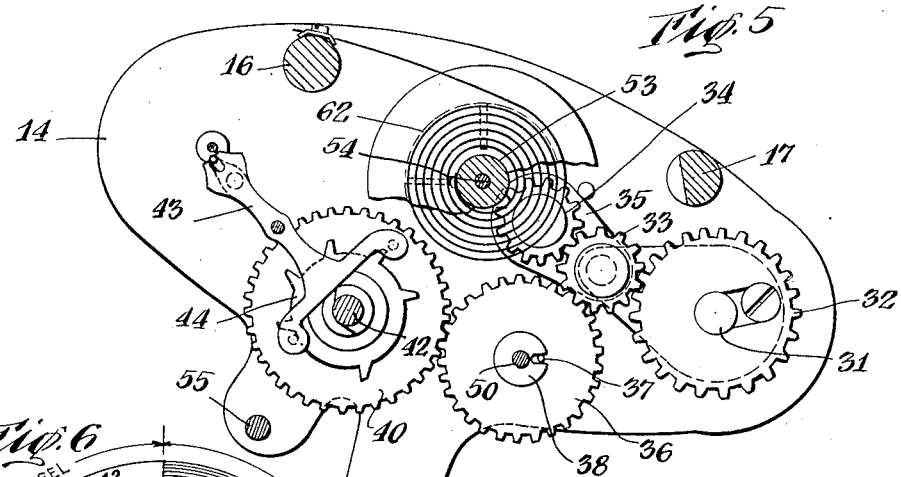
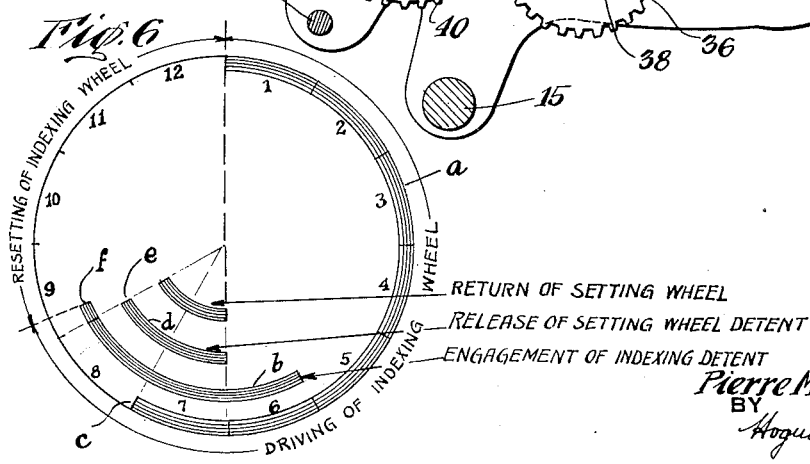
INVENTOR
Pierre Marie Girard
BY
Hoguet, Neary & Campbell
ATTORNEYS Patented June 8, 1937

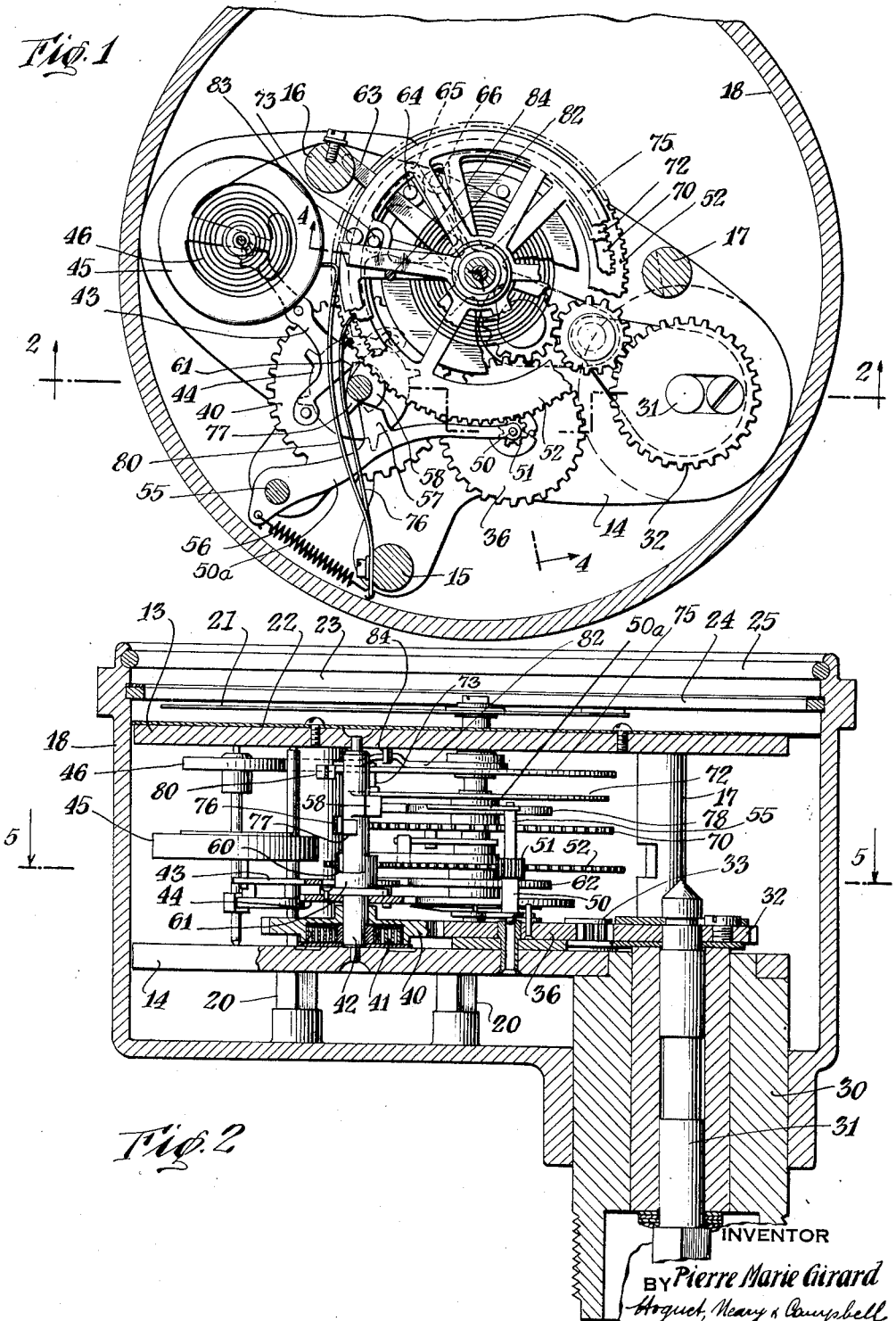

2,082,949

UNITED STATES PATENT OFFICE 2,082,949

TACHOMETER

Pierre Marie Girard, Courbevoie, France, assignor to Jaeger Watch Company, Inc., New York, N. Y., a corporation of New York Application December 15, 1934, Serial No. 757,691

14 Claims. (Cl. 264—21)

This invention relates to measuring instruments and particularly to instruments for measuring and indicating the operating speed of an engine or other analogous mechanism.

It is recognized that speed indicators of many varied types have heretofore been devised and used in many situations. However, many of these devices have been designed for particular uses and as a result their construction makes them unsuitable for many other purposes so that the instruments are not capable of universal use. Where speed indicators have been constructed to be sensitive, they are apt to respond too quickly to slight changes, causing the indicating pointer, or similar part, to oscillate over the dial. Likewise, speed indicating instruments that have been specially constructed so as not to be influenced by lost motion in connected parts are not suitable for many purposes since they are apt to lag behind the engine and indicate a speed different from that existing at the reading time. Such devices are obviously unsuitable for use in many situations, as in airplanes, when the engine is highly sensitive to sudden accelerations and decelerations caused by a variety of conditions encountered in flying. Further, due to the fact that airplanes fly at all angles, even upside down, and are often subject to forces causing sudden tilting or swaying movements, the use of certain types of speed indicating instruments, such as those of the magnetic or centrifugal type commonly used in automobiles, etc., is impractical since the angular position of the instrument, or changes in the angular position of airplanes, etc., and sudden movements of the latter are liable to affect their operating parts in such manner as to cause them to operate erratically and render their indications inaccurate.

Although speed is measured in units of time and often expressed in terms of revolutions per minute, it is frequently of importance to know what the speed of an engine is, not only during a minute, but during any fraction of a minute. Assuming that a constant engine speed could be maintained for a minute, half or quarter minute, it would only be necessary to count or register the number of revolutions during the interval, applying a correcting factor if the selected period were less than a minute. While such procedure may be followed in laboratory work, it is manifestly impractical under most operating conditions since it is too slow and laborious. Moreover, should the speed vary in the selected period of time, the result obtained would be merely an indication of the mean speed; the instantaneous speed might have been slower or faster at intervals. In many cases it is of paramount importance to know the engine speed at the instant at which the indicating instrument is referred to, as, for example, in connection with airplanes where safety in flying is dependent to a marked degree on reliable performance of the indicating device affording accurate information of engine speeds.

Beyond compensating or correcting for conditions, such as those mentioned above as improperly influencing many known speed measuring instruments, the problem of obtaining an accurate and continuous indication of speed is thus reduced to repeatedly effecting a measurement of speed during successive intervals of time sufficiently short to result in an accurate indication, but nevertheless not so short that the instrument may be improperly influenced by sudden accelerations or decelerations which exist for only an instant, or continue for too short an interval to be of consequence.

One object of the present invention is to provide a speed measuring instrument which affords an accurate indication of the speed of an engine or other device with which it is associated.

Another object is to provide a speed measuring instrument, the accuracy of which is not affected by changes in its angular position or sudden tilting or swaying movements imparted thereto.

A third object is to provide a speed measuring instrument which affords accurate and reliable indications despite sudden acceleration or deceleration in the speed of the engine or other mechanism with which it is connected.

A further object is to provide a speed measuring instrument which is simple and rugged in construction and reliable in operation.

Other objects and advantages of the invention will become apparent upon consideration of the following description and appended claims when read in conjunction with the accompanying drawings, in which:

Figure 1 is a plan view of the operating mechanism of a tachometer embodying the invention, as viewed in a plane just below the dial of the instrument, certain parts being shown in section and others broken away to illustrate details of construction;

Figure 2 is a sectional view along the line 2—2 in Figure 1;

Figure 3 is a side elevational view of the device as seen from the left of Figure 1 with the enclosing casing removed;

Figure 4 is a sectional view taken along the line 4—4 in Figure 1;

Figure 5 is a sectional view taken along the line 5—5 in Figure 2, and

Figure 6 is a cyclic diagram illustrating the operation of the device.

Referring to the drawings, the various operating parts of the tachometer are supported in plates 13 and 14 connected by spacing posts 15, 16 and 17 and mounted within a casing 18, plate 14 being secured thereto by screws, not shown, threaded into posts 20 on the plate. The pointer 21 of the tachometer operates over a graduated dial 22 and is visible through a glass 23 that is held in place against an annular ring 24 by a spring ring 25. A sleeve 30 mounted near the edge of plate 14 supports the tachometer drive shaft 31 which is adapted to be coupled in any suitable manner to the main or cam shaft of the engine or other device the speed of which is to be measured so as to be driven thereby.

As shown in Figure 5, shaft 31 is provided with a gear 32 meshing with the gear 33 of a pair of intermeshed reversing gears 33, 34 carried on a swinging plate 35 that is pivotally mounted so that one gear or the other meshes with a gear 36 according to the direction of rotation of gear 32. Thus, gear 36 is always driven in the same direction regardless of the direction of rotation of drive shaft 31, and hence of the engine shaft.

Gear 36 meshes with gear teeth on a spring barrel 40 for maintaining the spring 41 (Figure 2) tensioned to drive a timing or cam shaft 42. The operation of cam shaft 42 by spring 41 is controlled by an escapement lever 43 associated with an escapement wheel 44 fixed to the cam shaft so that the latter makes a revolution in a predetermined unit of time. Escapement lever 43 is associated with a balance wheel 45 and coiled spring 46 in usual manner, the outer end of the spring being secured to spacing post 16.

An operating shaft 50, mounted at one end in gear 36, has fixed thereto a pinion 51 for driving an indexing wheel 52 carried by a sleeve 53 rotatably mounted on a shaft 54. Gear 36 drives shaft 50 as by engagement of a driving pin 37 (Figures 4 and 5) on the gear with a notch or slot in a collar 38 fixed to the shaft. The shaft 50 is swivelled in gear 36 so that it may be rocked to engage and disengage pinion 51 with wheel 52. The other end of shaft 50 is secured to a lever 50a (Figure 1) mounted on a stub shaft 55 journalled in plates 13 and 14. A spring 56 connected between spacing post 15 and lever 50a biases the latter for engaging pinion 51 with wheel 52. A lug 57 on lever 50a is positioned for engagement by a cam 58, once during a rotation of cam shaft 42 for disengaging pinion 51 from wheel 52. Wheel 52 is held in its operated position by a spring detent 60 (Figures 2 and 3) extending from post 15 and adapted to be disengaged by a cam 61 once during a rotation of cam shaft 42, at a time when pinion 51 is demeshed from wheel 52 for permitting a coil spring 62, connected at opposite ends to sleeve 53 and post 16, to return the wheel to its initial position. A radially extending stop arm 63 loosely mounted at one end on shaft 54 above wheel 52 is frictionally connected with the latter for movement therewith. In the return movement of wheel 52 effected by spring 62 a stud 64 carried by the wheel engages arm 63 to positively carry the latter along with the wheel. Arm 63 projects beyond the edge of wheel 52 and is adapted to contact post 16, (Figure 1) to stop wheel 52 in its initial or starting position.

A radial arm 65 also loosely mounted on shaft 54 and frictionally operable with wheel 52 is engageable by the stud 64 on the wheel and is in turn adapted to engage a stud 66 on a toothed setting wheel 70 rotatable on shaft 54. This arrangement provides a driving connection between the wheels 52 and 70 so that the wheel 52 may at times advance the wheel 70 and it also provides a means for adjusting the setting wheel 70 to a position corresponding to that of the indexing wheel 52, as will be described later.

Carried by a sleeve 71 rotatable on shaft 54 is a coupling wheel 72 (Figure 4) provided with a stud 73 extending into a coupling opening in a stabilizing wheel 75 carried by a sleeve 74 rotatably mounted on shaft 54. Sleeve 74 extends through plate 13 and has fixed thereto the pointer 21 that rotates over the graduated dial 22 to indicate the speed of the engine or other device whose operations are being measured by the tachometer.

From the foregoing it may be seen that setting wheel 70, coupling wheel 72, stabilizer wheel 75 and pointer 21 operate as a unit. A spring detent 76 (Figure 3) extending from post 15 is engageable with the teeth of setting wheel 70 to hold this unit in various positions determined by indexing wheel 52 in the operation of the latter. A cam 77 on cam shaft 42 is adapted to engage and release detent 76 at a time when indexing wheel 52 is held in its operated position by the related detent 60. A coil spring 78 connected at opposite ends to sleeve 71 and post 16 is provided for reversely operating the unit including setting wheel 70, coupling wheel 72, etc. A spring finger 80 extending from post 16 engages the periphery of stabilizer wheel 75 for controlling the return movement of the wheels 70, 72, etc.

Mounted on sleeve 74 between stabilizer wheel 75 and a collar 81 so as to be frictionally connected to wheel 75 is a radial stop arm 82 engageable by a stud 83 carried by the wheel so as to partake of the return movement of the latter as effected by spring 78. Arm 82 is adapted to engage a stationary stud 84 mounted in plate 13 for stopping the wheels 70, 72, 75 and pointer 21 in the zero indicating position of the latter, when movement of these parts to this extent is permitted by the indexing wheel 52.

The operation is as follows: When drive shaft 31 is operated as by coupling it to the main or cam shaft of an engine, it acts through gear 33 or 34 to drive gear 36 constantly in the same direction at a rate proportional to the speed of the engine shaft. Gear 36 acts through the connection formed by driving pin 37 and collar 38 to operate shaft 50 and pinion 51 thereon at the same rate. Gear 36 also rotates spring barrel 40 to tension spring 41 which actuates cam shaft 42, the spring forming a slip connection between gear 36 and shaft 42 so that the latter may rotate at a speed different from that of gear 36 and, hence, independently of the rate of operation of drive shaft 31 and the engine shaft.

Cam shaft 42 is controlled by the escapement mechanism 43—46 so that each revolution of the shaft takes place in a predetermined unit of time. In the illustrative embodiment of the invention disclosed herein, the escapement mechanism is arranged to cause a rotation of cam shaft 42 to take place in twelve vibrations of balance wheel 45 which may correspond with a time interval of two seconds, for example. Thus a rotation or single cycle of operation of cam shaft is divided into twelve periods as indicated by the cyclic diagram (Figure 6).

During the periods designated 1 to 7 in Figure 6 the spring 56 acts on lever 50a causing engagement of pinion 51 with indexing wheel 52 so that in these seven periods wheel 52 is driven, as indicated at a in Figure 6, and there is imparted to the latter an angular displacement corresponding to the speed of the engine shaft.

Wheel 52 acts through stud 64 thereon, the floating arm 65, and the stud 66 carried by setting wheel 70 to effect a corresponding displacement of the latter. Wheel 70 in turn, acting through sleeve 71, operates coupling wheel 72 and the latter acts through stud 73 and stabilizer wheel 75 to actuate sleeve 74 so that the pointer 21 is advanced over dial 22 to indicate the speed of the engine shaft.

It will be apparent from consideration of later parts of the description that the operation just described takes place only when the tachometer starts from its zero position or when the speed of the engine in a particular operating cycle of shafts 42 exceeds that of the previous cycle.

During the sixth period, as indicated at b in Figure 6, cam 61 moves from contact with spring detent 60 and the latter engages indexing wheel 52 for holding it in the position to which it is advanced by pinion 51. At or towards the end of the seventh period, as indicated at c in Figure 6, cam 58 engages lever 50a operating the latter to rock shaft 59 in its swivel mounting in gear 36 so as to disengage pinion 51 from wheel 52. Pinion 51 is maintained disengaged by cam 58 through the eighth to twelfth periods, or remainder of the cycle.

During the seventh period, as indicated at d in Figure 6, cam 77 disengages detent 76 from the setting wheel 70 and spring 78 acts to move the latter reversely until the stud 66 thereon contacts the floating arm 65. Spring 78 may act during whatever portion of the seventh and eighth periods is necessary to engage stud 66 with arm 65. Since arm 65 has been advanced with indexing wheel 52, by means of the stud 64 thereon, the new position of setting wheel 70 corresponds with that of the indexing wheel. Inasmuch as coupling wheel 72, stabilizer wheel 75 and pointer 21 are connected to operate in unison with setting wheel 70, as previously described, they partake of the reverse movement of the latter that is effected by spring 78. Stabilizer wheel 75 and brake finger 80 engaging the latter control the reverse movement of these parts. Thus, the position of pointer 21 relatively to the indications of dial 22 is corrected to correspond with the angular displacement imparted to indexing wheel 52 during periods one to seven of this cycle and, hence, pointer 21 indicates the engine speed during the cycle. The operations here described take place only when the engine decelerates during a particular measuring cycle so that its speed is less than that in the previous cycle.

In the event the engine has accelerated in a particular measuring cycle so that its speed exceeds that of the previous cycle, the indexing wheel 52 acting through stud 64, floating arm 65 and the stud 66 on setting wheel 70 will pick up the latter at the time during the first seven periods of the cycle when the instantaneous speed of the engine reaches and exceeds that attained in the previous cycle. Setting wheel 70 will then be carried along with indexing wheel 52 until the angular displacement of the latter in accordance with the higher speed in the cycle terminates at the end of the seventh period thereof. When setting wheel 70 is thus carried along with indexing wheel 52 the pointer 21 is advanced correspondingly, as described above, so that it immediately indicates the higher engine speed.

At the end of the eighth period, as indicated at e in Figure 6, cam 77 moves from contact with spring detent 76 and the latter reengages setting wheel 70 to hold it and pointer 21 in their corrected positions. Detent 76 retains the setting wheel and pointer in their adjusted positions during the remainder of the cycle (i. e. through periods nine to twelve) and during part of the following cycle (through periods one to seven) until the detent is again released in the seventh period of the following cycle for enabling readjustment of the wheel and pointer, as described above.

During the ninth period, as indicated at f in Figure 6, cam 61 moves detent 60 from engagement with indexing wheel 52 and, since pinion 51 is disengaged from the latter, spring 62 acts to return the indexing wheel to its initial position. Spring 62 may act during whatever part of the ninth to twelfth periods is necessary for causing wheel 52, acting through stud 64, to carry stop arm 63 into engagement with spacing post 16 (Figure 1), so that the indexing wheel is brought to rest in its starting position. At the beginning of the first period of the next cycle cam 58 releases lever 50a and spring 56 acts thereon to again mesh pinion 51 with indexing wheel 52 so that the latter may be displaced angularly in proportion to the speed of the engine during the measuring periods of the cycle.

When the engine operates at a constant speed for an interval of several cycles the indexing wheel 52 is repeatedly advanced in the early or measuring part of each cycle through a corresponding angular displacement until it carries the arm 65 into contact with the stud 66 on setting wheel 70 and is then returned to its initial position during the later or resetting part of each cycle. Setting wheel 70 and pointer 21 having once been adjusted, as described above, to a position corresponding to the constant speed of the engine remain in that position until the engine again accelerates or decelerates, whereupon their positions are corrected to correspond with whatever change of speed takes place, as set forth previously.

The various parts are restored to their normal starting positions when the engine stops, in the following manner. In the operation of the tachometer the slip connection between gear 36 and cam shaft 42 permits a residuum of power to be stored in spring 41 so that the latter continues to operate cam shaft 42 for an interval of several cycles after the engine has stopped. During the resetting period of the cycle in which complete stopping of the engine occurs the indexing wheel 52 was returned to its starting position, as described above. It remains at rest during the measuring period of the next cycle because the engine has stopped. When detent 76 is released by cam 77 in the seventh period of this cycle, setting wheel 70, coupling wheel 72, stabilizer wheel 75 and pointer 21 are moved reversely by spring 78 until the arm 82, carried along with the stabilizer wheel 75 by the stud 83 thereon, engages the stationary stop stud 84 mounted in plate 13. At this time stud 66 engages arm 65 which contacts the stud 64 on indexing wheel 52. The pointer 21 is then in its zero indicating position and the various measuring wheels are in their starting positions.

In the event that the speed of the engine causes the indexing wheel 52 to be displaced to an extent sufficient to cause it and pointer 21 to exceed the range of the tachometer, by completing a full revolution and continuing into a second, the operating pinion 51 is automatically demeshed from indexing wheel 52 in order to avoid damage. In the first revolution of pointer 21 and indexing wheel 52 the stop arm 63, frictionally carried along with the latter, contacts the shaft 50 and is brought to rest thereby. Thus, as indexing wheel 52 continues through the first revolution the wheel and stud 64 thereon leave arm 63 behind. During the movement of wheel 52 through part of a second revolution the stud 64 thereon comes up in back of arm 63 (i. e., at the side thereof opposite to its usual position) and engaging the arm causes the latter to rock operating shaft 50 and disengage pinion 51 from indexing wheel 52.

From the foregoing description it may be seen that the speed of an engine or the like is repeatedly measured at short intervals by effecting a proportional displacement of the indexing wheel in the early part of each cycle of operation and that the measurement is promptly transferred to the setting wheel for adjusting the pointer to indicate the speed. The duration of the timing interval is preferably sufficiently short that the tachometer does not lag appreciably in responding to indicate changes in the engine speed but affords a substantially instantaneous and accurate indication of the engine speed at any instant. At the same time, purely transitory accelerations or decelerations do not cause wavering or fluctuation of the indicating pointer, as often occurs in instruments where the indicating element is directly connected to and driven from an engine-connected operating shaft. This is due herein to the fact that the measuring impulse or displacement is imparted to the indexing wheel which, normally, is disconnected from the pointer during the measuring periods.

It should be noted that, as a result of them division of the timing cycle into periods for enabling the performance of the various functions, the various parts of the device operate smoothly and without possibility of interference with each other. For example, the detent for the indexing wheel is caused to engage the latter sufficiently in advance of the release of the detent for the setting wheel so that the latter, when returned to take up a position corresponding with that of the indexing wheel, may not improperly jar or otherwise move this wheel from its displaced measuring position. The detent for the setting wheel is also caused to reengage the latter after an adequate interval to permit it to be positioned to correspond with the indexing wheel, and yet promptly enough to cause its position to be maintained before the release of the indexing wheel detent. Further, the timing arrangement provides an ample interval for the indexing wheel to be fully returned to its starting position from any position to which it may be moved by the operating shaft effecting displacement thereof in proportion to the engine speed. This also results in obviating possible clashing between gear 51 and the indexing wheel since the latter is temporarily at rest upon reengagement by the gear at the beginning of the measuring periods.

It should also be noted that sudden tilting or swaying movements imparted to the tachometer, or changes in its angular position, cannot result in accidental and improper movement of the various parts because the indexing and setting wheels or the pointer, when not being operated in one direction or the other, as described above, are securely held against improper shifting by the related detents.

Further, the operation of the timing shaft from the engine by the drive shaft eliminates the accumulation of errors in timing, such as may take place in instruments provided with conventional key wound clock-works because of variations in the tension of their driving spring due to running down of the latter or fatigue. At the same time, the provision in the present device of a slip connection between the drive and timing shafts, with the latter under control of an independent escapement, enables operation of the timing shaft at a rate independent of the drive shaft although driven by the latter.

Particular reference has been made in the discussion herein to the measurement of the speed of airplane engines and the tachometer of the invention is deemed particularly suitable for this purpose. However, it is to be understood that such particular reference is only by way of example and it is considered that the present device is capable of universal use in obtaining measurements of speed whether with airplane, automobile or stationary engines or other machines, the operating speed of which is of interest.

Inasmuch as there are many changes and variations which may be made without departing from the spirit of the invention, as exemplified herein by description and illustration of an illustrative embodiment thereof, it is desired and intended to include all such changes and variations within the scope of the following claims.

I claim:

1. In a tachometer; indicating means; a drive shaft adapted to be coupled to an engine for measuring the speed thereof; an indexing wheel controlling said indicating means; a setting wheel connected to said indicating means; a stabilizing wheel for said setting wheel; a coupling wheel located between said stabilizing wheel and said setting wheel; a radially extending arm frictionally connected with said indexing wheel for movement therewith; a second radially extending arm frictionally operable with said indexing wheel; a stud on said indexing wheel for engaging said two radially extending arms; a stud on said setting wheel for engaging said second mentioned arm whereby a driving connection is established between said indexing wheel and said setting wheel; a radially extending stop arm frictionally connected with said stabilizing wheel; a stud on said stabilizing wheel for engaging said stop arm so as to cause said arm to partake of the return movement of said stabilizing wheel; and a stationary stud so positioned as to engage said stop arm for stopping said arm, said stabilizing wheel, said coupling wheel, and said setting wheel.

2. In a tachometer for measuring the speed of an engine or the like and having an indexing wheel, a setting wheel, a coupling wheel, and a stabilizing wheel all cooperatively associated with each other; the combination of a radially extending arm frictionally connected with said indexing wheel for movement therewith; a second radially extending arm frictionally operable with said indexing wheel; a stud on said indexing wheel for engaging said two radially extending arms; a stud on said setting wheel for engaging said second mentioned arm whereby a driving connection is established between said indexing wheel and said setting wheel; a radially extending stop arm frictionally connected with said stabilizing wheel; a stud on said stabilizing wheel for engaging said stop arm so as to cause said arm to partake of the return movement of said stabilizing wheel; and a stationary stud so positioned as to engage said stop arm for stopping said arm, stabilizing wheel, coupling wheel, and setting wheel.

3. In a tachometer; indicating means; a drive shaft adapted to be coupled to an engine or the like for measuring the speed thereof; a setting member connected to said indicating means; a toothed indexing member controlling said indicating means through the medium of said setting member; means for stabilizing the movements of said setting member, said last named means comprising a stabilizing wheel and a coupling wheel and means for coupling said toothed indexing member to said coupling wheel to move the three as a unit; an operating shaft; a pinion on said operating shaft engageable with said indexing member for operating the latter; means urging said pinion into engagement with said indexing member; time controlled means for periodically disengaging said pinion from said indexing member; a radially extending arm frictionally connected with said indexing member for movement therewith; a second radially extending arm frictionally operable with said indexing member; a stud on said indexing member for engaging said two radially extending arms; a stud on said setting member for engaging said second mentioned arm whereby a driving connection is established between said indexing member and said setting member; a radially extending stop arm frictionally connected with said stabilizing wheel; a stud on said stabilizing wheel for engaging said stop arm so as to cause said arm to partake of the return movement of said stabilizing wheel; and a stationary stud so positioned as to engage said stop arm for stopping said stop arm, stabilizing wheel, coupling wheel, and setting member.

4. In a tachometer; indicating means; a drive shaft adapted to be coupled to an engine or the like for measuring the speed thereof; a setting member connected to said indicating means; a toothed indexing member controlling said indicating means, through the medium of said setting member; means for stabilizing the movements of said setting member, said last named means comprising a stabilizing wheel and a coupling wheel and means for coupling said toothed indexing member to said coupling wheel to move the three as a unit; a rockably mounted operating shaft; means connecting said drive and operating shafts for operation in unison; a pinion fixed to said operating shaft; means acting on said operating shaft to engage said pinion with said indexing member; means for rocking said operating shaft to disengage said pinion from said indexing member; a radially extending arm frictionally connected with said indexing wheel for movement therewith; a second radially extending arm frictionally operable with said indexing member; a stud on said indexing member for engaging said two radially extending arms; a stud on said setting member for engaging said second mentioned arm whereby a driving connection is established between said indexing member and said setting member; a radially extending stop arm frictionally connected with said stabilizing wheel; a stud on said stabilizing wheel for engaging said stop arm so as to cause said arm to partake of the return movement of said stabilizing wheel; and a stationary stud so positioned as to engage said stop arm for stopping said stop arm, stabilizing wheel, coupling wheel, and setting member.

5. In a tachometer; indicating means; a drive shaft adapted to be coupled to an engine or the like for measuring the speed thereof; a setting member connected to said indicating means, a toothed indexing member controlling said indicating means through the medium of said setting member, means for stabilizing the movements of said setting member, said last named means comprising a stabilizing wheel and a coupling wheel and means for coupling said toothed indexing member to said coupling wheel to move the three as a unit; an operating shaft; a pinion on said operating shaft engageable with said indexing member for operating the latter; means urging said pinion into engagement with said indexing member; and time controlled means for periodically disengaging said pinion from said indexing member.

6. In a tachometer; indicating means; a drive shaft adapted to be coupled to an engine or the like for measuring the speed thereof; a setting member connected to said indicating means, a toothed indexing member controlling said indicating means through the medium of said setting member, means for stabilizing the movements of said setting member, said last named means comprising a stabilizing wheel and a coupling wheel and means for coupling said toothed indexing member to said coupling wheel to move the three as a unit; a rockably mounted operating shaft; means connecting said drive and operating shafts for operation in unison; a pinion fixed to said operating shaft; means acting on said operating shaft to engage said pinion with said indexing member; and means for rocking said operating shaft to disengage said pinion from said indexing member.

7. In a tachometer; indicating means; a drive shaft adapted to be coupled to an engine or the like for measuring the speed thereof; a setting member connected to said indicating means, a toothed indexing member controlling said indicating means through the medium of said setting member, means for stabilizing the movements of said setting member, said last named means comprising a stabilizing wheel and a coupling wheel and means for coupling said toothed indexing member to said coupling wheel to move the three as a unit; a rotatable member operable by said drive shaft; an operating shaft rockably mounted coaxially of said rotatable member; means interconnecting said rotatable member and operating shaft for actuation in unison by said drive shaft; a pinion fixed to said operating shaft; means acting on said operating shaft to engage said pinion with said indexing member; and means for rocking said operating shaft to disengage said pinion from said indexing member.

8. In a tachometer; indicating means; a drive shaft adapted to be coupled to an engine or the like for measuring the speed thereof; a setting member connected to said indicating means, a toothed indexing member controlling said indicating means through the medium of said setting member, means for stabilizing the movements of said setting member, said last named means comprising a stabilizing wheel and a coupling wheel and means for coupling said toothed indexing member to said coupling wheel to move the three as a unit; a rotatable member operable by said drive shaft; an operating shaft rockably mounted in said rotatable member coaxially thereof; means connecting said rotatable member and operating shaft for operation in unison by said drive shaft; a pinion on said operating shaft; means acting to engage said pinion with said indexing member; and means for rocking said operating shaft in its mounting in said rotatable member to disengage said pinion from said indexing member.

9. In a tachometer; indicating means; a drive shaft adapted to be coupled to an engine or the like for measuring the speed thereof; a setting member connected to said indicating means; a toothed indexing member controlling said indicating means, through the medium of said setting member; means for stabilizing the movements of said setting member, said last named means comprising a stabilizing wheel and a coupling wheel and means for coupling said toothed indexing member to said coupling wheel to move the three as a unit; a rotatable member operable by said drive shaft; an operating shaft rockably mounted co-axially of said rotatable member; means interconnecting said rotatable member and operating shaft for actuation in unison by said drive shaft; a pinion fixed to said operating shaft; means acting on said operating shaft to engage said pinion with said indexing member; means for rocking said operating shaft to disengage said pinion from said indexing member; a radially extending arm frictionally connected with said indexing member for movement therewith; a second radially extending arm frictionally operable with said indexing member; a stud on said indexing member for engaging said two radially extending arms; a stud on said setting member for engaging said second mentioned arm whereby a driving connection is established between said indexing member and said setting member; a radially extending stop arm frictionally connected with said stabilizing wheel; a stud on said stabilizing wheel for engaging said stop arm so as to cause said stop arm to partake of the return movement of said stabilizing wheel; and a stationary stud so positioned as to engage said stop arm for stopping said stop arm, stabilizing wheel, coupling wheel, and setting member.

10. In a tachometer; indicating means; a drive shaft adapted to be coupled to an engine or the like for measuring the speed thereof; a setting member connected to said indicating means; a toothed indexing member controlling said indicating means through the medium of said setting member; means for stabilizing the movements of said setting member, said last named means comprising a stabilizing wheel and a coupling wheel and means for coupling said toothed indexing member to said coupling wheel to move the three as a unit; a rotatable member operable by said drive shaft; an operating shaft rockably mounted in said rotatable member coaxially thereof; means connecting said rotatable member and operating shaft for operation in unison by said drive shaft; a pinion on said operating shaft; means acting to engage said pinion with said indexing member; means for rocking said operating shaft in its mounting in said rotatable member to disengage said pinion from said indexing member; a radially extending arm frictionally connected with said indexing member for movement therewith; a second radially extending arm frictionally operable with said indexing member; a stud on said indexing member for engaging said two radially extending arms; a stud on said setting member for engaging said second mentioned arm whereby a driving connection is established between said indexing member and said setting member; a radially extending stop arm frictionally connected with said stabilizing wheel; a stud on said stabilizing wheel for engaging said stop arm so as to cause said stop arm to partake of the return movement of said stabilizing wheel; and a stationary stud so positioned as to engage said stop arm for stopping said stop arm, stabilizing wheel, coupling wheel, and setting member.

11. In a tachometer for periodically measuring the speed of an engine or the like; indicating means; a drive shaft adapted to be operated by the engine; indexing means; disengageable means connecting said drive shaft to said indexing means for displacing the latter from an initial position in proportion to the engine speed during a determined time interval; timing means; means controlled by said timing means for actuating said connecting means at the end of said interval to disconnect said indexing means from said drive shaft; means for holding said indexing means in the position to which the latter has been displaced during said interval; setting means for said indicating means operatively connected thereto; holding means for said setting means; means controlled by said timing means and operative at the end of said time interval to release the holding means for said setting means; means for moving said setting means toward the displaced position of said indexing means; means associated with said indexing and said setting means for stopping the latter in a position corresponding to the position to which said indexing means was displaced during said interval, the holding means for said setting means being subsequently operative to hold said setting and indicating means in said position; means controlled by said timing means for subsequently releasing the holding means for said indexing means; means operative to return said indexing means to the initial position thereof on release of the holding means therefor; means for stabilizing the movements of said setting member; said means comprising a stabilizing wheel and a coupling wheel and means for coupling said indexing member to said coupling wheel and the latter to said stabilizing wheel to move the three as a unit; said indicating means being connected to and movable in response to the movements of said stabilizing wheel; and means controlled by said timing means for actuating said connecting means, subsequent to return of said indexing means, to reconnect the latter to said drive shaft.

12. In a tachometer for periodically measuring the speed of an engine or the like; indicating means; a drive shaft adapted to be operated by the engine; indexing means; disengageable means connecting said drive shaft to said indexing means for displacing the latter from an initial position in proportion to the engine speed during a determined time interval; timing means; means controlled by said timing means for actuating said connecting means at the end of said interval to disconnect said indexing means from said drive shaft; means for holding said indexing means in the position to which the latter has been displaced during said interval; setting means for said indicating means operatively connected thereto; holding means for said setting means; means controlled by said timing means and operative at the end of said time interval to release the holding means for said setting means; means for moving said setting means toward the displaced position of said indexing means; means associated with said indexing and said setting means for stopping the latter in a position corresponding to the position to which said indexing means was displaced during said interval, the holding means for said setting means being subsequently operative to hold said setting and indicating means in said position; means controlled by said timing means for subsequently releasing the holding means for said indexing means; means operative to return said indexing means to the initial position thereof on release of the holding means therefor; means controlled by said timing means for actuating said connecting means, subsequent to return of said indexing means, to reconnect the latter to said drive shaft; means for stabilizing the movements of said setting member; said means comprising a stabilizing wheel and a coupling wheel and means for coupling said indexing member to said coupling wheel and the latter to said stabilizing wheel to move the three as a unit; said indicating means being connected to and movable in response to the movements of said stabilizing wheel; a stud on said setting member; a stud on said indexing member; and an arm positioned intermediate said studs and adapted to contact the stud on said indexing member and to be engaged by the stud on said setting member for stopping the latter in a position corresponding to the position to which said indexing member has been displaced during said interval.

13. In a tachometer for periodically measuring the speed of an engine or the like; indicating means; a drive shaft adapted to be operated by the engine; indexing means; disengageable means connecting said drive shaft to said indexing means for displacing the latter from an initial position in proportion to the engine speed during a determined time interval; timing means; means controlled by said timing means for actuating said connecting means at the end of said interval to disconnect said indexing means from said drive shaft; means for holding said indexing means in the position to which the latter has been displaced during said interval; setting means for said indicating means operatively connected thereto; holding means for said setting means; means controlled by said timing means and operative at the end of said time interval to release the holding means for said setting means; means for moving said setting means toward the displaced position of said indexing means; means associated with said indexing and said setting means for stopping the latter in a position corresponding to the position to which said indexing means was displaced during said interval, the holding means for said setting means being subsequently operative to hold said setting and indicating means in said position; means controlled by said timing means for subsequently releasing the holding means for said indexing means; means operative to return said indexing means to the initial position thereof on release of the holding means therefor; means controlled by said timing means for actuating said connecting means, subsequent to return of said indexing means, to reconnect the latter to said drive shaft; a stud on said setting member; a stud on said indexing member; an arm positioned intermediate said studs and adapted to be engaged by the stud on said indexing member and to contact the stud on said setting member for operating the latter in unison with said indexing member during at least the latter part of said time interval; means for stabilizing the movements of said setting member; said means comprising a stabilizing wheel and a coupling wheel and means for coupling said indexing member to said coupling wheel and the latter to said stabilizing wheel to move the three as a unit, said indicating means being connected to and movable in response to the movements of said stabilizing wheel, means controlled by said timing means and operative after said time interval for holding said indicating means and setting member in the position to which the latter has been operated by said indexing means; means controlled by said timing means for subsequently releasing the holding means for said indexing means; and means operative to return said indexing means to the initial position thereof upon release of the holding means therefor.

14. In a tachometer; indicating means, a drive shaft adapted to be coupled to an engine or the like and actuated by the latter for measuring the speed thereof; indexing means; timing means; disengageable means connecting said indexing means and drive shaft for periodically displacing said indexing means from a determined initial position in proportion to the engine speed during a determined time interval; means operable by said timing means for actuating said connecting means to disconnect said drive shaft and indexing means at the end of said interval; setting means operatively connected to said indicating means; means controlled by said timing means for positioning said setting means at the end of said interval in accordance with the displacement of said indexing means during said interval; means for stabilizing the movements of said setting member, said means comprising a stabilizing wheel and a coupling wheel and means for coupling said indexing member to said coupling wheel and the latter to said stabilizing wheel to move the three as a unit, said indicating means being connected to and movable in response to the movements of said stabilizing wheel; and means operable by said drive shaft for actuating said timing means at a rate independent of the rate of operation of said drive shaft comprising a shaft for said timing means, a spring barrel actuated by said drive shaft, a spring connected to said barrel and to said timing shaft, and an escapement mechanism associated with said shaft for controlling the rate of operation of the latter by said drive-shaft-actuated spring.

PIERRE MARIE GIRARD.